United States Patent [19]

Kurata

[11] Patent Number: 5,018,821
[45] Date of Patent: May 28, 1991

[54] OPTICAL CONNECTOR FERRULE AND METHOD FOR ASSEMBLING THE SAME

[75] Inventor: Kazuhiko Kurata, Tokyo, Japan
[73] Assignee: NEC Corporation, Tokyo, Japan
[21] Appl. No.: 454,828
[22] Filed: Dec. 22, 1989

[30] Foreign Application Priority Data

Dec. 23, 1988 [JP] Japan ............................. 63-323248

[51] Int. Cl.$^5$ ............................................. G02B 6/36
[52] U.S. Cl. .............................. 350/96.20; 350/96.21
[58] Field of Search ........................ 350/96.20, 96.21

[56] References Cited

U.S. PATENT DOCUMENTS

| | | | |
|---|---|---|---|
| 4,448,483 | 5/1984 | Pyley, Jr. ........................ | 350/96.21 |
| 4,915,471 | 4/1990 | Zimmermann et al. ......... | 350/96.21 |
| 4,915,472 | 4/1990 | Liu .................................. | 350/96.21 |

Primary Examiner—William L. Sikes
Assistant Examiner—Phan T. Heartney
Attorney, Agent, or Firm—Sughrue, Mion, Zinn, Macpeak & Seas

[57] ABSTRACT

An optical connector ferrule comprises a capillary member, and a ferrule body. The capillary member is provided with a straight bore communicating from one end to the other end, and with a first slit and a second slit, respectively, for communicating the straight bore to the external of the capillary member. An auxiliary optical fiber is fixed in the straight bore of the capillary member, such that one end of the auxiliary optical fiber is aligned with the one end of the capillary member, and the other end of the auxiliary optical fiber is positioned on the central point of the first slit which is positioned on a side of the one end of the capillary member. An optical matching material is filled from the first slit into a portion of the straight bore which is limited by the second slit, thereby covering the inserted end of the auxiliary optical fiber. The capillary member is fixed in the ferrule body. An optical fiber is inserted from the second end into the capillary member to be fixed in the straight bore thereof. In this structure, the optical matching material does not propagate beyond the second slit. Therefore, the optical fiber is stably adhered to the inner surface of the straight bore of the capillary member.

5 Claims, 4 Drawing Sheets

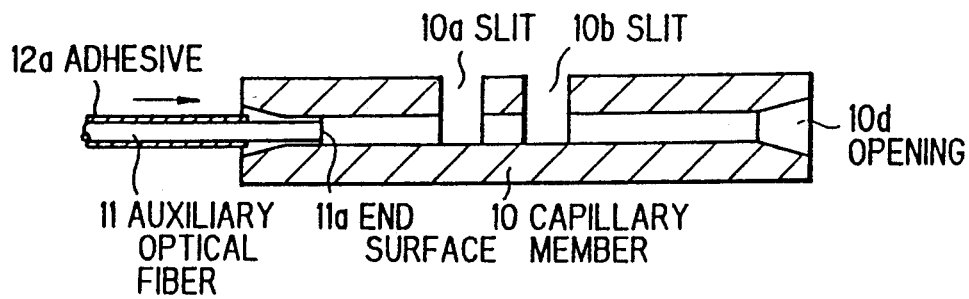
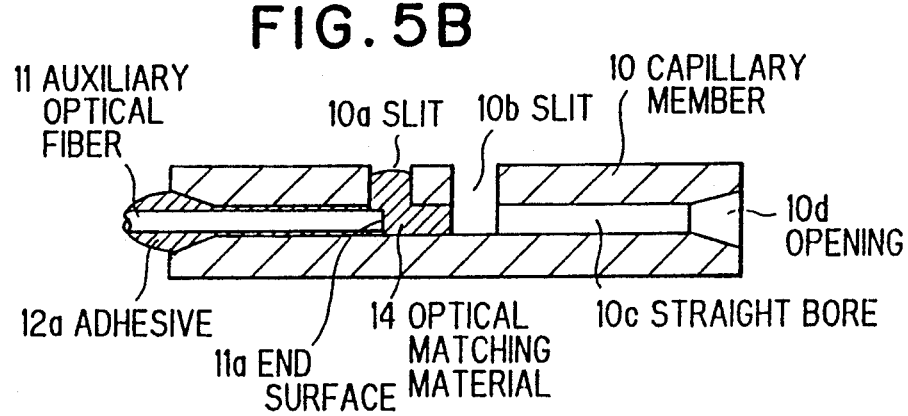
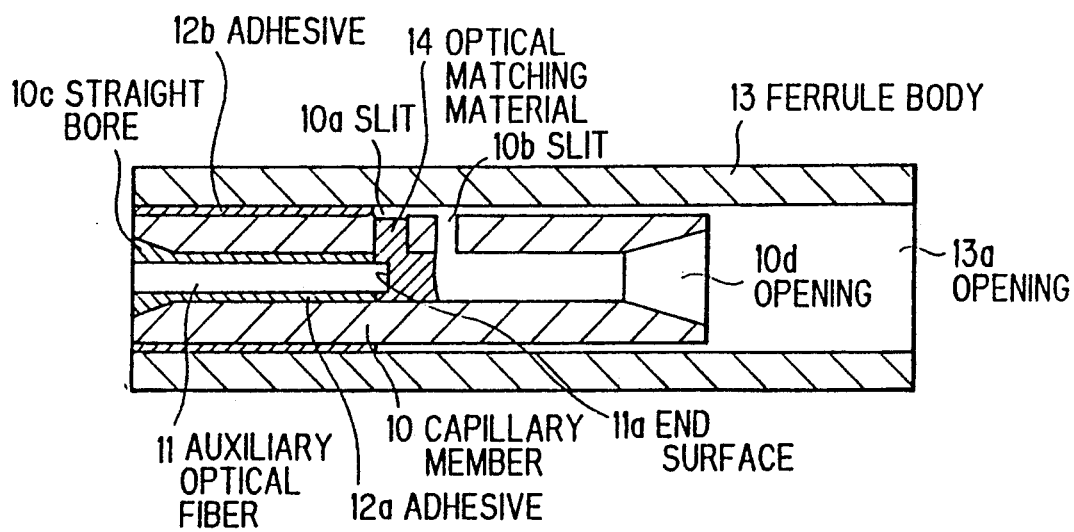

OPTICAL CONNECTOR FERRULE AND METHOD FOR ASSEMBLING THE SAME

FIELD OF THE INVENTION

This invention relates to an optical connector for connecting two optical fibers, and a method for assembling the same, and more particularly to, an optical connector ferrule, in which an auxiliary optical fiber is fixed to be held, and a method for assembling the same.

BACKGROUND OF THE INVENTION

Two types of optical connector ferrules have been described in Japanese Patent laid-open No. 63307409, the laid-open date of which is Dec. 15, 1988.

The first type of the optical connector ferrule comprises a ferrule body which is provided with a straight bore, and an auxiliary optical fiber which is fixed in the straight bore, such that the end surface of the auxiliary optical fiber is positioned at an intermediate portion of the straight bore.

In connecting two optical fiber cables, an optical fiber of one of the two optical fiber cables is inserted from one end of the ferrule body, at which the auxiliary optical fiber is not positioned, into the straight bore, such that the end surfaces of the auxiliary optical fiber and the inserted optical fiber face each other with an optical alignment in the straight bore. Thus, the inserted optical fiber is optically coupled to the auxiliary optical fiber by use of an optical matching (alignment) material which is filled into the straight bore before the insertion of the optical fiber, and is at least positioned between the end surfaces of the inserted optical fiber and the auxiliary optical fiber.

The second type of the optical connector ferrule comprises a pipe-shaped ferrule body, a glass capillary which is provided with a straight bore communicated through a slit at an intermediate portion to the external, and is fixed to be held in the ferrule body, and an auxiliary optical fiber which is fixed in the straight bore, such that the end surface of the auxiliary optical fiber is positioned not to extend beyond the slit.

In connecting two optical fiber cables, an optical fiber of one of the two optical fiber cables is inserted from one end of the ferrule body and then one end of the glass capillary, at which the auxiliary optical fiber is not positioned, into the straight bore, such that the end surfaces of the auxiliary optical fiber and the inserted optical fiber face each other with an optical alignment in the glass capillary. Thus, the auxiliary optical fiber and the inserted optical fiber are optically coupled to each other in the glass capillary by use of an optical matching material in the same manner as in the first type of the optical connector ferrule.

However, the first type of the optical connector ferrule has a disadvantage in that it is difficult to fill the optical matching material into the straight bore of the ferrule body without involving air in the optical matching material, because no air-escape means is provided in the ferrule body. Furthermore, the first type of the optical connector ferrule has a further disadvantage in that an optical fiber is pushed back to the inserting end of the ferrule body due to piston phenomenon, when the optical fiber is to be inserted into the ferrule, after the filling of the optical matching material is carried out, because an excess optical matching material can only escape through a clearance between the ferrule and the inserted optical fiber.

These disadvantages are overcome in the second type of the optical connector ferrule, because the glass capillary is provided with the slit functioning as an air-escape means and an optical matching material-escape means.

However, the second type of the optical connector ferrule has a disadvantage in that the optical matching material is liable to immerse between the inner surface of the straight bore of the glass capillary and the inserted optical fiber, thereby hindering the adhering of the inserted optical fiber to the inner surface thereof. If an optical matching material having an adhering property is used to avoid this disadvantage, an optical alignment of the inserted optical fiber and the auxiliary optical fiber is deteriorated, because the or flaking of the hardened optical matching material is liable to occur due to temperature change and a vibration thereof.

SUMMARY OF THE INVENTION

Accordingly, it is an object of this invention to provide an optical connector ferrule in which an inserted optical fiber is stably fixed to an inner surface of a straight bore of a glass capillary, even if an optical matching material having no adhering property is used.

It is a further object of this invention to provide an optical connector ferrule in which a stable characteristic is obtained to withstand a temperature change and vibration thereof.

It is a still further object of this invention to provide a method for assembling an optical connector ferrule in which the assembling operation is relatively easy.

According to the first feature of the invention, an optical connector ferrule, comprises:

a capillary member provided with a straight bore having an inner diameter slightly larger than an outer diameter of an optical fiber;

an auxiliary optical fiber fixed in the straight bore of the capillary member, one end of the auxiliary optical fiber being aligned with a corresponding end of the capillary member, and an opposite end of the auxiliary optical fiber being positioned at an approximately intermediate portion in the straight bore of the capillary member; and a ferrule body provided around an outer surface of the capillary member, one end of the ferrule body being aligned with the corresponding end of the capillary member, and an opposite end of the ferrule body extending over an opposite end of the capillary member;

wherein the auxiliary optical fiber, the capillary member, and the ferrule body are coaxially arranged on a core of the optical fiber, and the capillary member is provided with at least two slits for communicating the straight bore to the external of the capillary member, one of the at least two slits which is positioned on a side of the one end relative to a remaining slit of the at least two slits being provided on the one end of the auxiliary optical fiber.

According to the second feature of the invention, a method for assembling an optical connector ferrule, comprises:

providing a capillary member provided with a straight bore having an inner diameter slightly larger than an outer diameter of an optical fiber and communicating from a first end to a second end, and at least two slits formed with a predetermined interval to communicate the straight bore to an external thereof;

inserting an auxiliary optical fiber into the straight bore of the capillary member for the first end to be fixed in the straight bore and aligned with the first end, one end of the auxiliary optical fiber being positioned on a central point of a first slit of the at least two slits which is positioned on a side of the first end;

filling an optical matching material from the first slit into a portion of the straight bore limited by a remaining slit of the at least two slits to cover the one end of the auxiliary optical fiber;

providing a ferrule body having an inner diameter slightly larger than an outer diameter of the capillary member and a length longer than that of the capillary member; and inserting the capillary member into the ferrule body to be fixed to an inner surface of the ferrule body and aligned with one end of the ferrule body.

BRIEF DESCRIPTION OF THE DRAWINGS

This invention will be explained in more detail in conjunction with appended drawings, wherein:

FIGS. 5A to 5C are cross-sectional views showing a method for assembling an optical connector ferrule in a preferred embodiment according to the invention.

DETAILED DESCRIPTION OF THE PREFERRED EMBODIMENT

Before explaining an optical connector ferrule in the preferred embodiment according to the invention, the aforementioned first and second types of the conventional optical connector ferrules will be explained in FIGS. 1 and 2.

Figure 1:
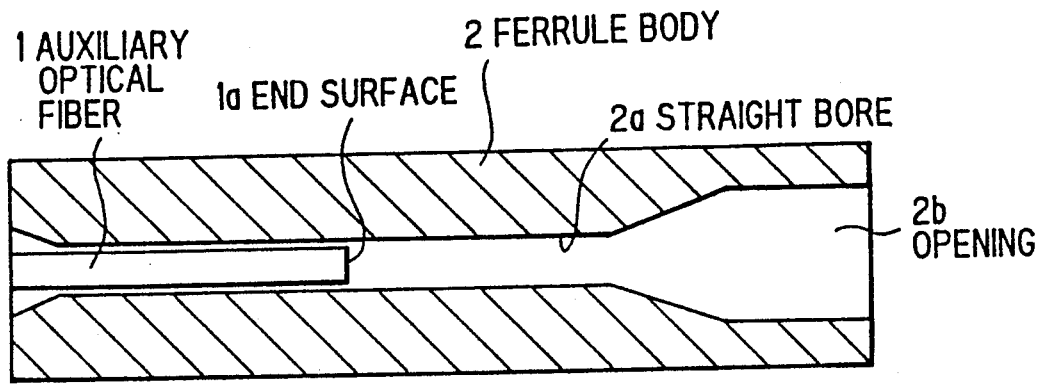
FIGS. 1 and 2 are cross-sectional views showing first and second types of conventional optical connector ferrules.

FIG. 1 shows the first type of the optical connector ferrule which comprises a ferrule body 2 having a straight bore 2a and an enlarged opening 2b at one end thereof, and an auxiliary optical fiber 1 fixed to be held in the straight bore 2a and having a connecting end surface 1a positioned at an intermediate portion of the straight bore 2a.

In connecting an optical fiber cable (not shown) to the optical connector ferrule, an optical matching material (not shown) is first filled into the straight bore 2a at a limited portion of the end surface 1a of the auxiliary optical fiber 1. Then, an optical fiber which is exposed in a terminal treatment from one end of the optical fiber cable is inserted through the enlarged opening 2b of the ferrule body 2 into the straight bore 2a thereof, thereby being in contact in the presence of the optical matching material to the end surface 1a of the auxiliary optical fiber 1. In this state, the optical fiber cable is fixed from the external of the ferrule body by use of a fixing member (not shown) to complete the connection of the optical fiber cable to the optical connector ferrule. The other end surface of the auxiliary optical fiber 1 is optically coupled to another optical fiber of an optical fiber cable, etc.

However, the first type of the optical connector ferrule has the aforementioned disadvantages.

Figure 2:
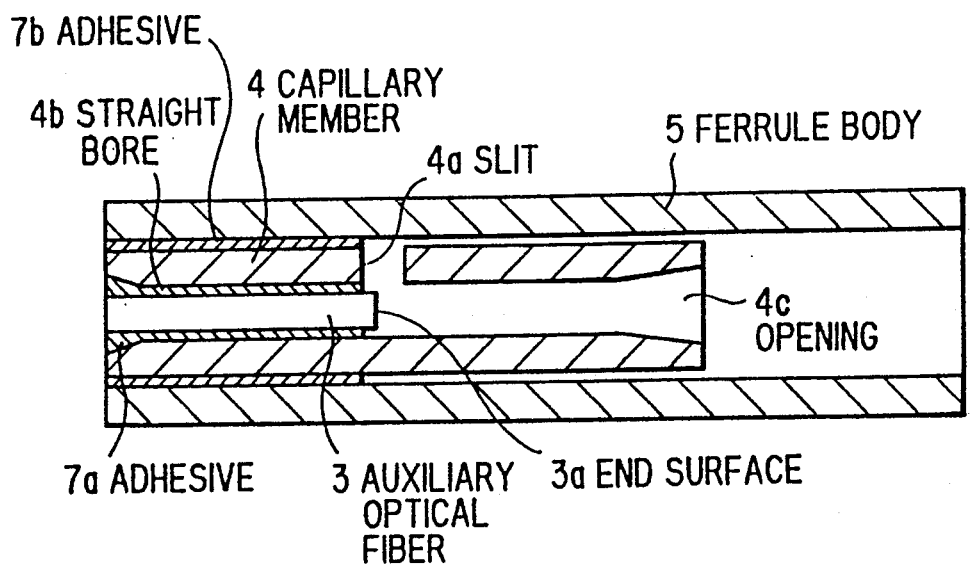

FIG. 2 shows the second type of the optical connector ferrule which comprises a ferrule body 5, a capillary member 4 provided with a straight bore 4b communicating through a slit 4a to the external thereof and to an opening 4c, and an auxiliary optical fiber 3 having an end surface 3a, wherein the auxiliary optical fiber 3 is fixed to the inner surface of the straight bore 4b by used of an adhesive 7a, such that the end surface 3a of the auxiliary optical fiber 3 is positioned at a portion where the slit 4a is provided, and the capillary member 4 is fixed to the inner surface of the ferrule body 5, the opening 4c of the capillary member 4 is positioned to provide a predetermined distance from one end of the ferrule body 5.

In connecting an optical fiber cable (not shown) to the optical connector ferrule, an optical matching material is first filled into the straight bore 4b at a limited portion of the end surface 3a, so that no air is included in the optical matching material (not shown) due to the air-escape from the slit 4a. Then, an optical fiber which is exposed in a terminal treatment from one end of the optical fiber cable is inserted through the opening 4c of the capillary member 4 into the straight bore 4b of the capillary member 4, so that the inserted optical fiber is optically coupled through the optical matching material to the auxiliary optical fiber 3 at the end surface 3a, and is fixed to be held to the inner surface of the straight bore 4b of the capillary member 4 on the right side to the slit 4a by an adhesive (not shown) applied on the optical fiber before the insertion thereof.

However, the second type of the optical connector ferrule has also the aforementioned disadvantages.

Figure 3:
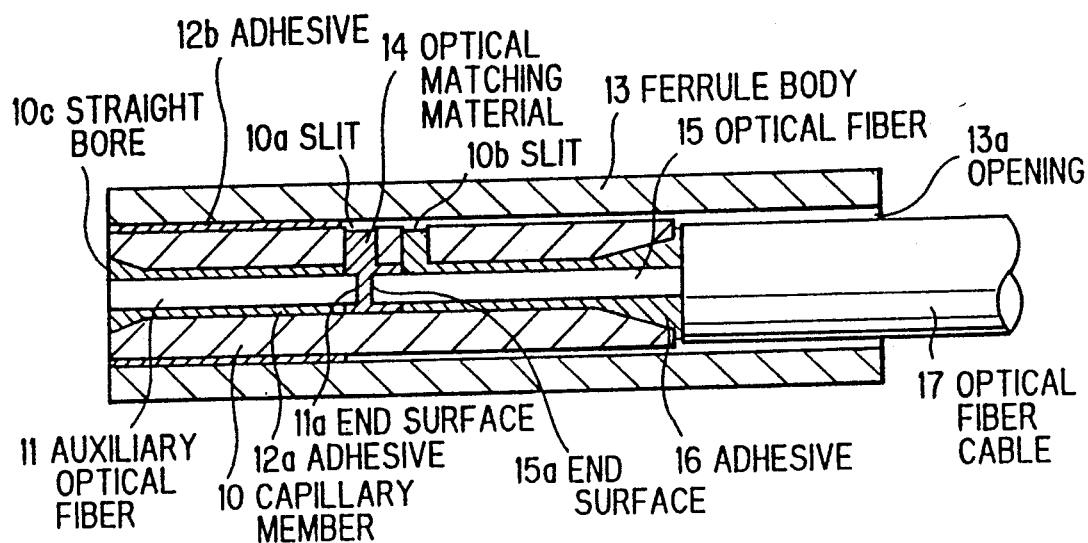
FIG. 3 is a cross-sectional view showing an optical connector ferrule in a preferred embodiment according to the invention.
Figure 4A:
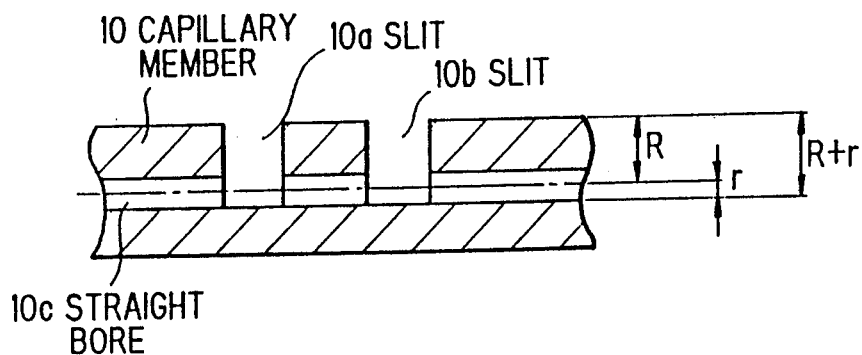
FIGS. 4A and 4B are a cross-sectional view and a perspective view showing a glass capillary used in the preferred embodiment.
Figure 4B:
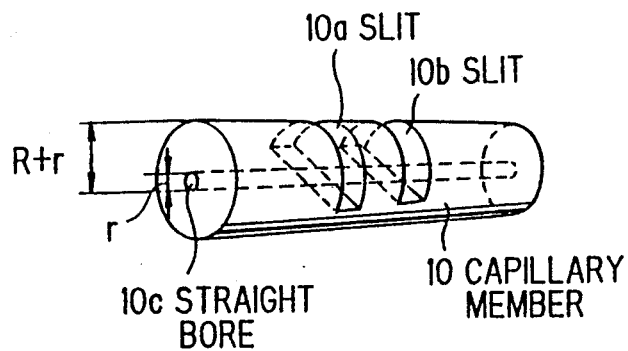

FIG. 3 shows an optical connector ferrule in the preferred embodiment according to the invention. The optical connector ferrule comprises a ferrule body 13, a capillary member 10, and an auxiliary optical fiber 11. The capillary member 10 is provided with a straight bore 10c having an inner diameter slightly larger than an outer diameter of the auxiliary optical fiber 11, and slits 10a and 10b for communicating the straight bore 10c to the external of the capillary member 10. For instance, an outer diameter of the ferrule body 13 is 2 to 2.5 mm, and an outer diameter of the capillary member 11 is 1 to 1.5 mm, so that the ferrule body 13 has a thickness to provide a predetermined mechanical strength, while an inner diameter of the straight bore 10c of the capillary member 10 is approximately 125 $\mu$m. The capillary member 10 is preferably of a glass, and the slits 10a and 10b are provided thereon, as more clearly shown in FIGS. 4A and 4B, by use of a blade saw (not shown) having a thickness of 0.2 to 0.5 mm. In more detail, the capillary tube 10 is provided with the slits 10a and 10b at two portions having a predetermined interval in accordance with a cutting operation of the blade saw by a depth of (R+r), where R is a radius of the capillary member 10, and r is a radius of the straight bore 10c. The auxiliary optical fiber 11 is fixed to be held in the straight bore 10c of the capillary member 10 by use of an adhesive 12a, such that an end surface 11a which is polished to be a mirror surface is positioned at a portion where the central point of the slit 10a is positioned. The adhesive 12a is, for instance, a thermosetting epoxy adhesive. Furthermore, the capillary member 10 is fixed, on the left side to the slit 10a, to an inner surface of the ferrule body 13 by use of an adhesive 12b which may be the same adhesive material as the adhesive 12a, so that the auxiliary optical fiber 11, the capillary member 10, and the ferrule member 13 are coaxially assembled to each other. As a matter of course, the auxiliary optical fiber 11, the capillary member 10, and the ferrule member 13 are arranged to provide a uniform flat plane on the left sides thereof. An optical fiber 15 having an end surface 15a which is polished to be a mirror surface is optically coupled through an optical matching material 14 to the end surface 11a of the auxiliary optical fiber 11, wherein the optical fiber is exposed from an optical fiber cable 17 which is inserted from the opening 13a of the ferrule member 13. The optical fiber 15 is also fixed in the straight bore 10c of the capillary member 10 by use of an adhesive 16. The adhesive 16 is, for instance, an UV adhesive such as a denatured acrylate having a viscosity of 300 to 1000 cps or a visible light-curing adhesive, because the capillary member 10 is a transparent glass tube in the preferred embodiment, and the optical matching material 14 is a material which is optically transparent, and has a refractive index equal to that of cores of the optical fibers 11 and 15. This material may be generally silicone oil or a grease-like material composed of silicone oil mixed with silica. In the preferred embodiment, the grease-like material is preferable to be used.

As clearly understood from the illustration in FIG. 3, the optical matching material 14 is not extended on the right side of the capillary member 10 relative to the right-side slit 10b, because the capillarity is interrupted between the optical fiber 15 and the inner surface of the straight bore 10c of the capillary member 10 in accordance with the presence of the slit 10b.

Next, a method for assembling an optical connector ferrule in the preferred embodiment will be explained in FIGS. 5A to 5C.

In FIG. 5A, the thermosetting epoxy adhesive 12a is applied on the outer surface of the auxiliary optical fiber 11 except for a portion of 1 mm from the end surface 11a, and the optical fiber 11 is then inserted from the left side into the straight bore 10c of the capillary member 10 to reach the central point of the left-side slit 10a, so that the adhesive 12a propagates in a predetermined time to the slit 10a in accordance with the capillarity between the auxiliary optical fiber 11 and the inner surface of the straight bore 10c of the capillary member 10.

In FIG. 5B, the auxiliary optical fiber 11 is fixed in the capillary member 10 in accordance with the thermosetting of the adhesive 12a. Then, the optical matching material 14 is filled from the left-side slit 10a into the straight bore 14 to cover the end surface 11a of the optical fiber 11. In this situation, no optical matching material 14 propagates beyond the left-side wall of the right-side slit 10b, because the capillarity is interrupted by the slit 10b.

In FIG. 5C, the adhesive 12b is applied on the outer surface of the capillary member 10 in the left-side portion relative to the left-side slit 10a, and the capillary member 10 is then inserted into the ferrule body 13 to be fixed to the inner surface thereof.

Figure 6:
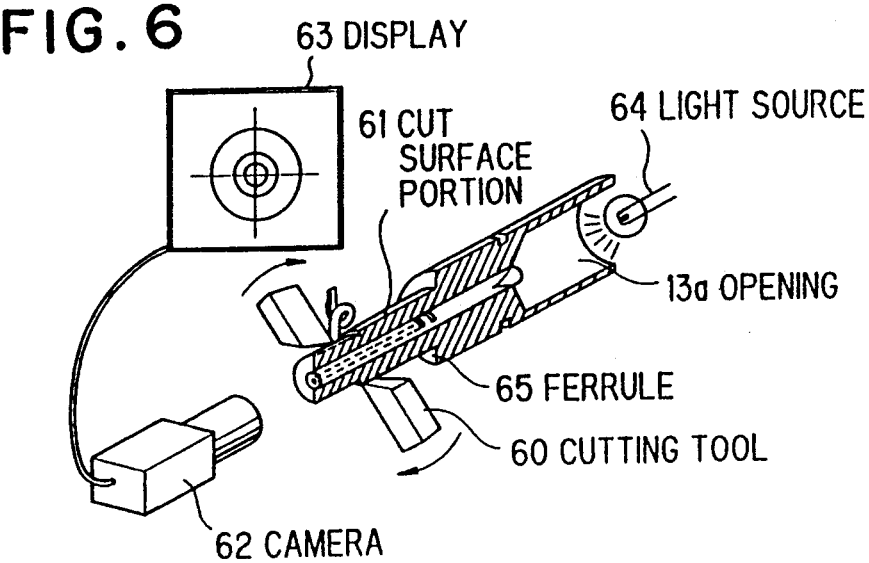
FIG. 6 is a cross-sectional and perspective view showing a centering process of an optical connector ferrule fabricated in the preferred embodiment.

The optical connector ferrule 65 thus assembled is subject to a centering process as shown in FIG. 6, wherein the assembled ferrule 65 is held on a machining apparatus (not shown) having a rotary cutting tool 60.

A light source 64 is provided behind the assembled ferrule 65 to supply light thereto, while a monitor camera 62 is provided in front of the assembled ferrule 65 to take an image of the assembled ferrule 65, through which light is propagated. Image signals of the monitor camera 62 are supplied to a monitor display 63.

In operation, the rotary cutting tool 60 is rotated to cut a portion 61 of the ferrule 65 on its outer surface, and the ferrule 65 is adjusted on the machining apparatus, such that the auxiliary optical fiber 11 is positioned in coincidence with the central axis of the ferrule 65 by monitoring an image displayed on the monitor display 63.

Finally, the connection of the optical fiber cable 17 to the ferrule 65 will be explained in FIGS. 7A and 7B.

Figure 7A:
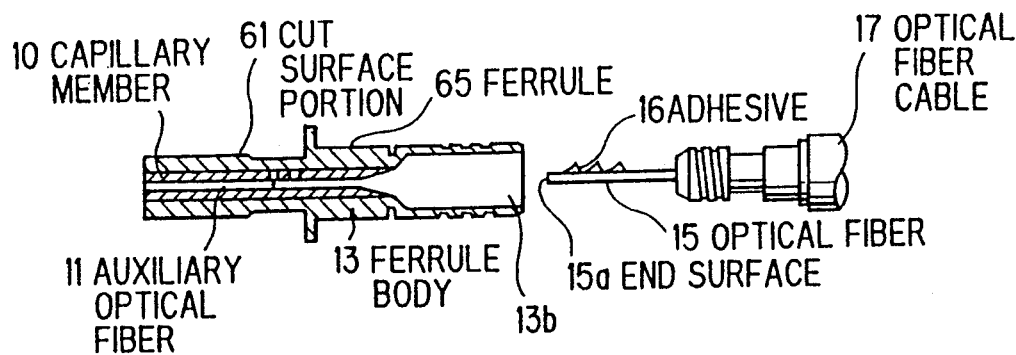
FIGS. 7A and 7B are partial cross-sectional views showing how to connect an optical fiber cable to the optical connector ferrule in the preferred embodiment.

In FIG. 7A, the UV adhesive 16 having a smaller viscosity than that of the optical matching material 14 is applied on the optical fiber 15 of the optical fiber cable 17, and the optical fiber 15 is then inserted into the capillary member 10. The UV adhesive 16 may be directly applied on the inner surface of the straight bore 10c of the capillary member 10. As described before, the end surface 15a of the optical fiber 15 is polished to be a mirror surface beforehand.

Figure 7B:
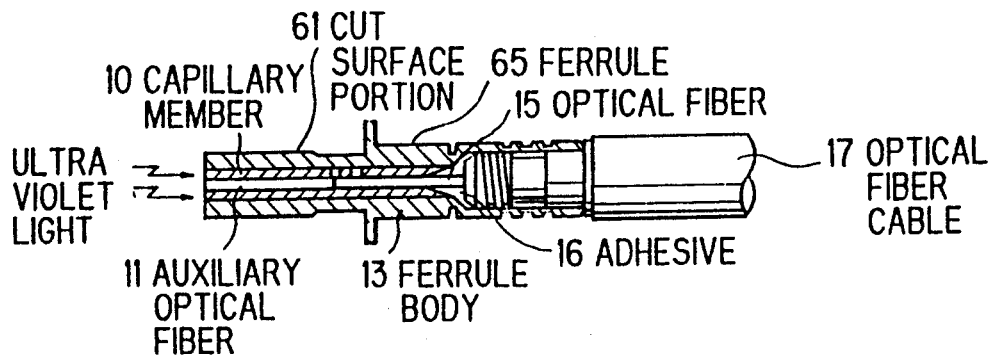

In FIG. 7B, ultra violet light is radiated to the capillary member 10 on the left side, and then propagated therethrough to harden the UV adhesive 16, so that the optical fiber 15 is fixed in the capillary member 10.

In inserting the optical fiber 15 into the capillary member 10, the right-side slit 10b functions as an air escape means, so that no air is left inside the capillary member 10. This makes it possible to insert the optical fiber 15 into the capillary member 10 smoothly. Furthermore, the UV adhesive 16 on the end surface 15a of the optical fiber 15 is not mixed with the optical matching material 14, when the end surface 15a of the optical fiber 15 plunges into the optical matching material 14, because the viscosity of the optical matching material 14 is higher than that of the UV adhesive 16. As a result, the entire length of the optical fiber 15 is fixedly adhered to the inner surface of the straight bore 10c of the capillary member 10.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. An optical connector ferrule, comprising:

a capillary member provided with a straight bore having an inner diameter slightly larger than an outer diameter of an optical fiber;

an auxiliary optical fiber fixed in said straight bore of said capillary member, a first end of said auxiliary optical fiber being aligned with a corresponding first end of said capillary member, and a second end of said auxiliary optical fiber being positioned at an approximately intermediate portion in said straight bore of said capillary member; and a ferrule body provided around an outer surface of said capillary member, a first end of said ferrule body being aligned with said corresponding first end of said capillary member, and a second end of said ferrule body extending over a second end of said capillary member;

wherein said auxiliary optical fiber, said capillary member, and said ferrule body are coaxially arranged, and said capillary member is provided with at least two slits for communicating said straight bore to an external of said capillary member, a first slit of said at least two slits which is positioned on a side of said first end relative to a remaining slit of said at least two slits, an end surface of said auxiliary optical fiber being positioned in registration with said first slit.

2. An optical connector ferrule, according to claim 1, further comprising:

an optical matching material supplied from one of said at least two slits to a portion of said straight bore of said capillary member limited by said remaining slit to cover said second end of said auxiliary optical fiber and one end of an optical fiber, said optical fiber being fixed in said straight bore at a portion except for a portion where said auxiliary optical fiber and said optical matching material exist in said straight bore of said capillary member.

3. A method for assembling an optical connector ferrule, comprising:

providing a capillary member provided with a straight bore having an inner diameter slightly larger than an outer diameter of an optical fiber and communicating from a first end to a second end, and at least two slits formed with a predetermined interval to communicate said straight bore to an external thereof;

inserting an auxiliary optical fiber into said straight bore of said capillary member for said first end to be fixed in said straight bore and aligned with said first end, one end of said auxiliary optical fiber being positioned on a point of a first slit of said at least two slits which is positioned on a side of said end;

filling an optical matching material from said first slit into a portion of said straight bore limited by a remaining slit of said at least two slits to cover said one end of said auxiliary optical fiber;

providing a ferrule body having an inner diameter slightly larger than an outer diameter of said capillary member and a length longer than that of said capillary member; and inserting said capillary member into said ferrule body to be fixed to an inner surface of said ferrule body and aligned with one end of said ferrule body.

4. A method for assembling an optical connector ferrule according to claim 3, further comprising:

inserting said optical fiber form said second end into said capillary member to be fixed in said straight bore, whereby an inserted end thereof reaches said optical matching material.

5. A method for assembling an optical connector ferrule according to claim 3, further comprising:

cutting the ferrule body on an outer surface, whereby cores of said auxiliary optical fiber and said optical fiber are positioned on an axis of said optical connector ferrule.

* * * * *

UNITED STATES PATENT AND TRADEMARK OFFICE
CERTIFICATE OF CORRECTION

PATENT NO. : 5,018,821

DATED : May 28, 1991

INVENTOR(S) : Kazuhiko KURATA

It is certified that error appears in the above-identified patent and that said Letters Patent is hereby corrected as shown below:

Col. 2, line 17, after "because the" insert --exfoliation--;

Col. 5, line 14, after the first occurrence of "fiber" insert --15--.

Signed and Sealed this

Fifteenth Day of September, 1992

*Attest:*

DOUGLAS B. COMER

*Attesting Officer*   *Acting Commissioner of Patents and Trademarks*